United States Patent
Savoie et al.

(10) Patent No.: US 7,597,033 B2
(45) Date of Patent: Oct. 6, 2009

(54) MACHINE FOR MACHINING OPTICAL WORKPIECES, IN PARTICULAR PLASTIC SPECTACLE LENSES

(75) Inventors: Marc Savoie, Wetzlar (DE); Edward McPherson, Asslar (DE)

(73) Assignee: Satisloh GmbH, Wetzlar (DE)

( * ) Notice: Subject to any disclaimer, the term of this patent is extended or adjusted under 35 U.S.C. 154(b) by 390 days.

(21) Appl. No.: 11/415,330

(22) Filed: May 1, 2006

(65) Prior Publication Data
US 2006/0260447 A1 Nov. 23, 2006

(30) Foreign Application Priority Data
May 6, 2005 (KR) ........................ 10 2005 021 640

(51) Int. Cl.
*B23B 3/00* (2006.01)
(52) U.S. Cl. .............................. 82/1.11; 82/118; 82/137
(58) Field of Classification Search ................. 29/27 R, 29/27 C; 82/11, 120, 121, 122, 132, 142, 82/148, 149, 154, 162
See application file for complete search history.

(56) References Cited

U.S. PATENT DOCUMENTS

| | | | | |
|---|---|---|---|---|
| 3,069,948 A | * | 12/1962 | Brusque | 82/132 |
| 3,181,382 A | * | 5/1965 | Berlo | 474/79 |
| 4,333,368 A | * | 6/1982 | Watt | 82/1.11 |
| 4,840,095 A | * | 6/1989 | Nussbaumer et al. | 82/117 |
| 5,168,609 A | * | 12/1992 | Kojima et al. | 29/27 R |
| 5,245,896 A | | 9/1993 | Erickson et al. | |
| 5,313,694 A | * | 5/1994 | Yonemoto et al. | 29/27 R |
| 5,490,307 A | * | 2/1996 | Link | 29/27 C |
| 5,765,456 A | * | 6/1998 | Grossmann | 82/1.11 |
| 5,938,381 A | * | 8/1999 | Diehl et al. | 409/132 |
| 5,964,016 A | * | 10/1999 | Ito et al. | 29/27 C |
| 6,227,952 B1 | | 5/2001 | Diehl et al. | |

(Continued)

FOREIGN PATENT DOCUMENTS

DE 494 264 4/1929

(Continued)

OTHER PUBLICATIONS

Precitech, Nanoform 200, Nanoform 350, Maschinen Handbuch (German Handbook), 3 pages.

(Continued)

*Primary Examiner*—Jason Daniel Prone
*Assistant Examiner*—Jennifer Swinney
(74) *Attorney, Agent, or Firm*—Reising Ethington P.C.

(57) ABSTRACT

A machine for machining optical workpieces, in particular plastic spectacle lenses, which has a workpiece spindle, which drives the workpiece in rotation about a workpiece rotation axis (B), and a fast tool arrangement, which moves a turning tool in a fast tool movement plane (X-F1), wherein the workpiece spindle and the fast tool arrangement can moreover be moved relative to one another in a plane (X-Y) which contains the workpiece rotation axis (B). The fast tool movement plane (X-F1) is positioned obliquely (work angle α) with respect to the plane (X-Y) containing the workpiece rotation axis (B). As a result, a machine is provided in which the working point of the cutting edge of the turning tool can be aligned in a particularly simple and highly precise manner on the rotation axis (B) of the workpiece spindle.

10 Claims, 6 Drawing Sheets

U.S. PATENT DOCUMENTS

| | | | |
|---|---|---|---|
| 6,523,443 B1 * | 2/2003 | Hof et al. | 82/1.4 |
| 6,991,525 B2 * | 1/2006 | Diehl et al. | 451/65 |
| 7,043,805 B2 * | 5/2006 | Tokuma et al. | 29/27 C |
| 7,137,939 B2 * | 11/2006 | Ueda | 483/27 |
| 7,448,304 B2 * | 11/2008 | Kikuchi et al. | 82/124 |
| 2003/0043343 A1 * | 3/2003 | Diehl et al. | 351/177 |
| 2005/0005744 A1 * | 1/2005 | Hirayama et al. | 82/1.11 |
| 2006/0073771 A1 * | 4/2006 | Mandler et al. | 451/42 |

FOREIGN PATENT DOCUMENTS

| | | |
|---|---|---|
| DE | 36 00 231 A1 | 7/1987 |
| DE | 4105768 A1 * | 8/1992 |
| DE | 42 27 268 A1 | 2/1994 |
| EP | 0 213 361 A1 | 7/1986 |
| EP | 0 758 571 A1 | 2/1997 |
| EP | 0 872 307 A1 | 4/1998 |
| EP | 872307 A1 * | 10/1998 |
| EP | 1036617 A1 * | 9/2000 |
| JP | 58171244 A * | 10/1983 |
| JP | 04013501 A * | 1/1992 |
| JP | 05237703 A * | 9/1993 |
| JP | 200107903 A * | 4/2000 |
| WO | WO 99/33611 | 7/1999 |
| WO | WO 02/06005 A1 | 1/2002 |

OTHER PUBLICATIONS 06006637.0-1262/1719585, Jul. 9, 2009, Search Report for counterpart EPO application.

* cited by examiner

MACHINE FOR MACHINING OPTICAL WORKPIECES, IN PARTICULAR PLASTIC SPECTACLE LENSES

TECHNICAL FIELD

The present invention relates to a machine for machining optical workpieces, in particular plastic spectacle lenses.

PRIOR ART

When machining plastic spectacle lenses, there is usually a spectacle lens "blank" which has been injection-molded from plastic and has a standardized machined convex outer surface with, for example, a spherical or progressive shape. Depending on the desired optical effect, the inner or prescription surfaces (usually concave) are given a spherical, aspherical, toric, atoric, progressive or free-form geometry (progressive lens surfaces) by means of cutting machining. The typical conventional procedure when machining inner surfaces provides that, once the spectacle lens blank has been placed with its outer surface on a block, a cutting or turning machining process is carried out to produce the optically active shape, usually followed by a fine grinding or polishing process to achieve the necessary surface quality.

For the abovementioned turning machining process, in the prior art use is also made of so-called fast tool turning machines in which a turning tool can be moved in a highly dynamic manner either in a linear reciprocating fashion (see, for example, WO 02/06005 A1) or in rotation (cf., for example, WO 99/33611 A1), so that non-rotationally symmetrical lens surfaces can be produced in the turning method. In this case, particularly when producing highly precise optical surfaces, the turning tool must be aligned in a highly precise manner with the working point of its cutting edge on the rotation axis of the workpiece spindle, so that no protruding unmachined zone remains in the center of the machined lens surface. According to the prior art, a highly precise height adjustment of the turning tool by means of special adjustment axes is thus required.

To this end, use is often made of flexural joints which can carry the turning tool or even the complete fast tool unit. By manually adjusting a fine threaded screw, the entire flexural joint on the opposite side of the turning tool is deformed, resulting in very fine height displacement of the cutting edge of the turning tool. An image of such an adjustment mechanism and a description of its function can be found for example in the machine handbook "*Precitech Nanoform® 200/Nanoform® 350*" from Precitech Inc., Keene, N.H., USA, pages 14 and 15.

Furthermore, tool holders and turrets are available which have suitable height adjustment possibilities for turning tools. In particular, exchangeable tool holders are known which have suitable mechanical height adjustment mechanisms (see, for example, documents U.S. Pat. No. 5,245,896 and DE 42 27 268 A1).

The height alignment is usually performed in tool preset units outside the machine, with the entire turning tool holder being moved into a device by means of a cross table to an adjustment piece which represents the position of the main spindle rotation axis. The height and position of the turning tool cutting edge is detected by a profile projector and brought into relation with the adjustment piece.

However, the known mechanisms all make use of manual adjustment. In order to permit automatic adjustment even during operation of the machining machine, an associated CNC-controlled adjustment spindle would have to be provided, which would entail a considerable outlay.

Based on the prior art according to WO 02/06005 A1, the object of the invention is to provide a machine for machining optical workpieces, in particular plastic spectacle lenses, comprising a fast tool arrangement, in which the working point of the cutting edge of the turning tool can be aligned in a highly precise manner on the rotation axis of the workpiece spindle in as simple a manner as possible.

SUMMARY OF THE INVENTION

According to the invention, in a machine for machining optical workpieces, in particular plastic spectacle lenses, which comprises a workpiece spindle, by means of which the workpiece can be driven in rotation about a workpiece rotation axis, and a fast tool arrangement, by means of which a turning tool can be moved in a fast tool movement plane, wherein the workpiece spindle and the fast tool arrangement can moreover be moved relative to one another in a plane which contains the workpiece rotation axis, the fast tool movement plane is positioned obliquely at a work angle with respect to the plane containing the workpiece rotation axis.

By virtue of the oblique position of the movement plane of the fast tool according to the invention in such a way that an angle of predetermined size exists between this movement plane and the plane containing the workpiece rotation axis, hence the workpiece rotation axis of the workpiece spindle, in conjunction with the adjustment movement of the workpiece spindle, which exists on the machine in any case, in the plane containing the workpiece rotation axis, more specifically in the direction of the workpiece spindle, a highly precise height adjustment of the turning tool cutting edge onto the workpiece rotation axis of the workpiece spindle can be achieved, without there being any need for height displacements of the turning tool cutting edge with respect to the fast tool arrangement. The extent of the adjustment movement of the workpiece spindle in the direction of its axis and thus the height compensation achieved thereby between the workpiece rotation axis of the workpiece spindle and the working point of the turning tool cutting edge depends on the sine function of the predetermined angle.

As a result, there is no need for any mechanical adjustment systems as are provided in the prior art and which, unlike the present invention, do not permit automatic height adjustment of the turning tool cutting edge during the machining operation. As a result, compared to the prior art, there is also a reduction in the weight of the masses that have to be moved by the fast tool arrangement, namely a reduction by the weight of the mechanical adjustment elements provided in the prior art between the turning tool and the shuttle of the fast tool arrangement, so that the dynamics and bandwidth of the fast tool arrangement are not limited by excessively high moving masses. This permits higher shape accuracy of the surfaces turned by the fast tool arrangement, and not least also leads to shorter machining times.

By virtue of the invention, not only is one complete adjustment axis saved and the number of required movement axes limited to a minimum, but also it is possible for the adjustment movements of tool (fast tool arrangement) and workpiece (workpiece spindle) to be split advantageously. For example, the adjustment movement of the workpiece spindle can be used to produce the rotationally symmetrical parts of a lens, that is to say the spherical part of the surface, while the non-rotationally symmetrical parts of the lens, as are present for example in the case of toric surfaces, prismatic surfaces, atoric surfaces or free-form surfaces, are produced via the adjustment movement of the fast tool arrangement. As a result, it is also possible to use fast tool arrangements with a shorter stroke and thus greater rigidity (due to the shorter lever), which in turn is beneficial to the quality of the surfaces produced.

With regard to the fine nature of the height adjustment of the turning tool cutting edge with respect to the workpiece rotation axis, it is preferred if the fast tool movement plane and the plane containing the workpiece rotation axis enclose a work angle of between 2° and 10°.

Although it is preferred, particularly with regard to the simplest possible mathematics when controlling the movement axes, if the turning tool can be adjusted in the axial direction in a positionally controlled manner by means of the fast tool arrangement, the basic concept of the present invention, namely the angular adjustment of the fast tool movement plane with respect to the plane containing the workpiece rotation axis, can also be implemented on a machine with a rotational fast tool arrangement, as known for example from WO 99/33611 A1. In this case, the fast tool movement plane is perpendicular to the pivot axis of the rotational fast tool.

BRIEF DESCRIPTION OF THE DRAWINGS

Hereinbelow, the invention will be explained in more detail on the basis of a preferred example of embodiment and with reference to the appended, partially schematic drawings. In the drawings.

DETAILED DESCRIPTION OF THE PREFERRED EMBODIMENT

FIGS. 1 to 5 schematically show a CNC-controlled machine 10 in particular for machining surfaces of spectacle lenses L made of plastic in a right-angled Cartesian co-ordinate system, in which the letters x, y and z denote the width direction (x), the length direction (y) and the height direction (z) of the machine 10.

Figure 1:
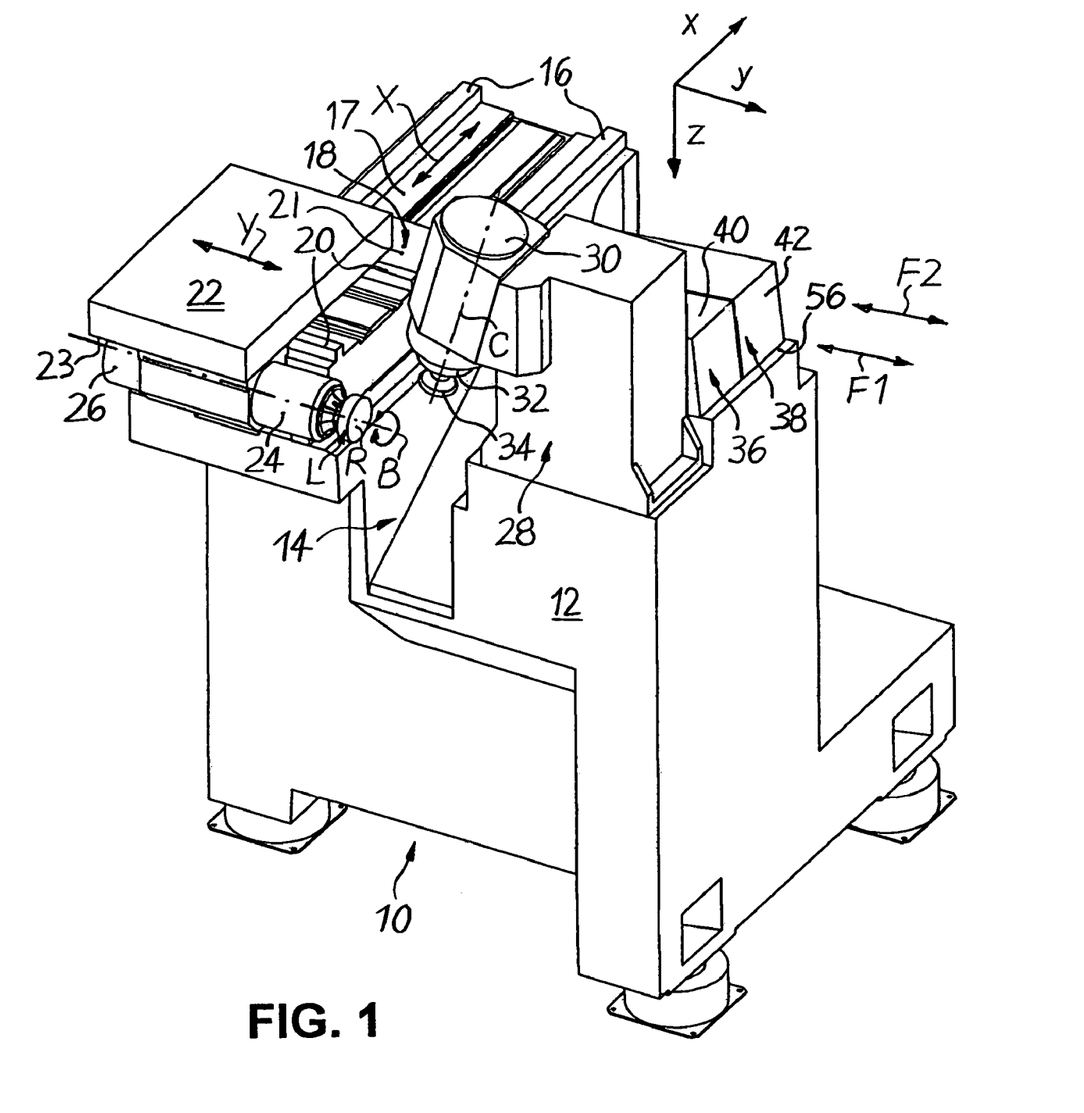
FIG. 1 shows a perspective view, obliquely from the front/above, of a machine according to the invention for machining optical workpieces, in particular plastic spectacle lenses, which is equipped in tool terms with a cutter unit and two fast tool arrangements.
Figure 2:
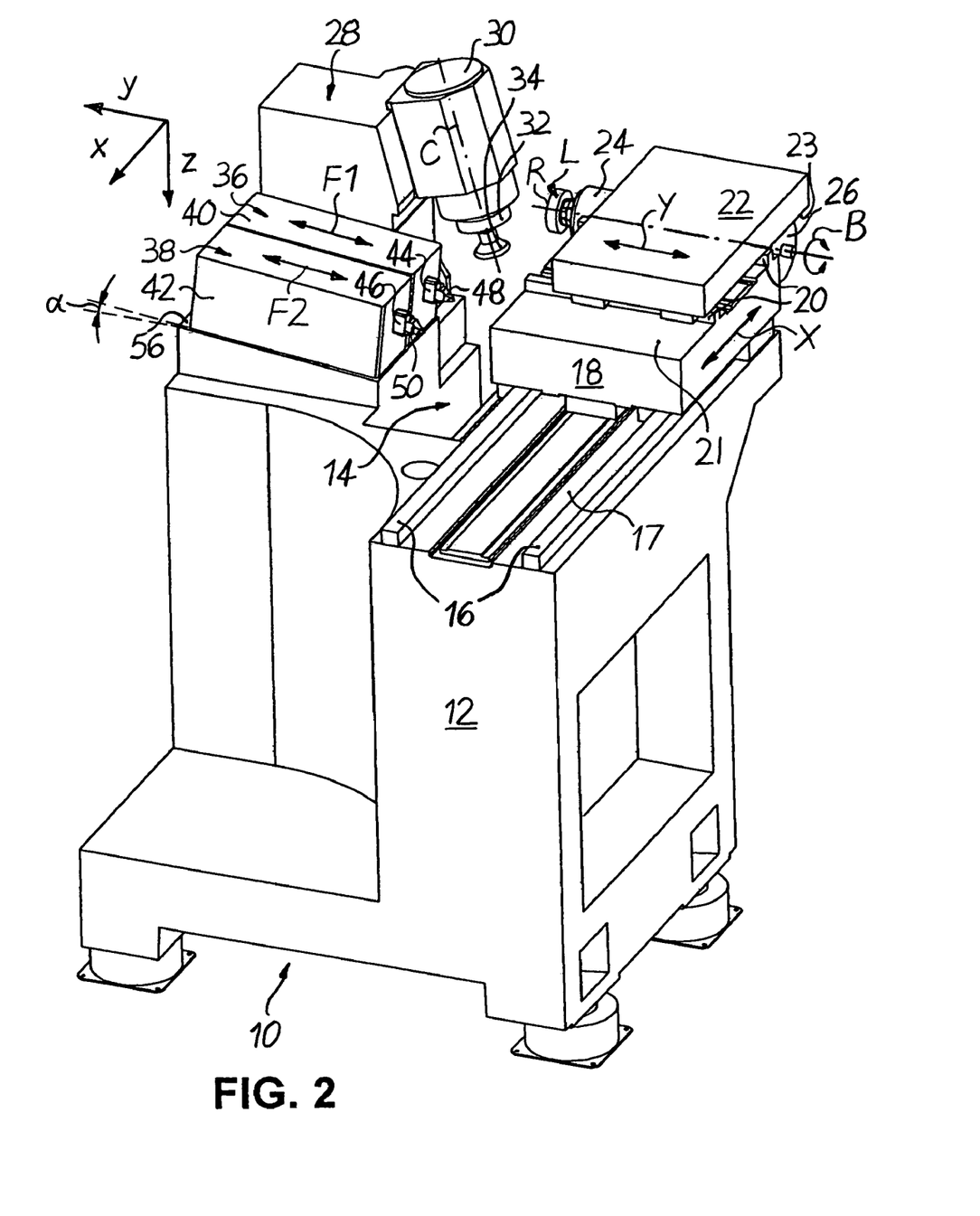
FIG. 2 shows a perspective view, obliquely from behind/above, of the machine according to FIG. 1.

As shown in FIGS. 1 to 5, the machine 10 comprises a machine frame 12, which delimits a machining area 14. Fixed to the left-hand side of the machining area 14 in FIG. 1 are two guide rails 16 which extend parallel to one another in the (horizontal) width direction x, on an upper mounting surface 17 of the machine frame 12 in FIG. 1. Displaceably mounted on the guide rails 16 is an X-slide 18, which can be adjusted in a CNC positionally controlled manner in both directions of an X axis by associated CNC drive and control elements (not shown).

Two further guide rails 20, which extend parallel to one another in the (likewise horizontal) length direction y and perpendicular to the guide rails 16, are fixed to an upper mounting surface 21 of the X-slide 18 in FIG. 1. A Y-slide 22 is displaceably mounted in a cross table arrangement on the guide rails 20, which Y-slide can be adjusted in a CNC positionally controlled manner in both directions of a Y axis by associated CNC drive and control elements (likewise not shown).

Fixed to a lower mounting surface 23 of the Y-slide 22 in FIGS. 1 to 4 is a workpiece spindle 24 which can be driven in rotation about a workpiece rotation axis B in a CNC-controlled manner in terms of rotational speed and angle of rotation by means of an electric motor 26. The workpiece rotation axis B is aligned with the Y axis. The spectacle lens L which is placed on a block for machining, in particular the prescription surface R of the spectacle lens L, is fitted in a manner known per se on the workpiece spindle 24, or more specifically the end thereof which projects into the machining area 14, in such a way that it can rotate in the same axis as the workpiece spindle 24.

It is obvious from the above description that the workpiece spindle 24 can be moved in an X-Y plane in a CNC positionally controlled manner by means of the cross table arrangement (X-slide 18, Y-slide 22), the X-Y plane containing the workpiece rotation axis B and being parallel to the mounting surfaces 17, 21 and 23, while the spectacle lens L can be rotated about the workpiece rotation axis B in a CNC-controlled manner in terms of rotational speed and angle of rotation.

Mounted on the machine frame 12 to the right-hand side of the machining area 14 in FIG. 1 is firstly a cutter unit 28, the structure and function of which is known in principle from EP 0 758 571 A1 by the Applicant. The cutter unit 28 comprises a cutter spindle 32 which can be driven at a controlled rotational speed about a cutter rotation axis C by means of an electric motor 30, with a cutter tool 34 being mounted on the end of the cutter spindle which projects into the machining area 14.

The cutter unit 28 can be used to carry out a cutting machining operation on the spectacle lens L, which comprises a plunge-cutting operation—according to the teaching of EP 0 758 571 A1—in which the cutter tool 34 rotating at a controlled rotational speed about the cutter rotation axis C and the spectacle lens L rotating at a controlled rotational speed about the workpiece rotation axis B are moved relative to one another in a positionally controlled manner in at least one of the two axis directions X and Y in such a way that the cutting edges of the cutter tool 34 produce an annular trough-shaped recess at least in the region of the outer edge of the spectacle lens L, before the cutter tool 34 is guided in a shaping operation along a spiral path by controlling the movement path of the spectacle lens L in the X and Y axes, that is to say is guided in the X-Y plane over the spectacle lens from the outside in, so as to remove further material. Optional, but preferred, procedures which take place during this cutting machining operation are the rim machining and the faceting of the spectacle lens L. During the rim machining, a machining of the spectacle lens blank is carried out by the rotating cutter tool 34 for example on the peripheral contour defined by the shape of the spectacle frame, whereas, during faceting, the upper and inner peripheral edge of the spectacle lens blank is beveled by the rotating cutter tool 34. These method steps have long been known to the person skilled in the art, and for this reason they will not be discussed in any greater detail at this point.

Figure 3:
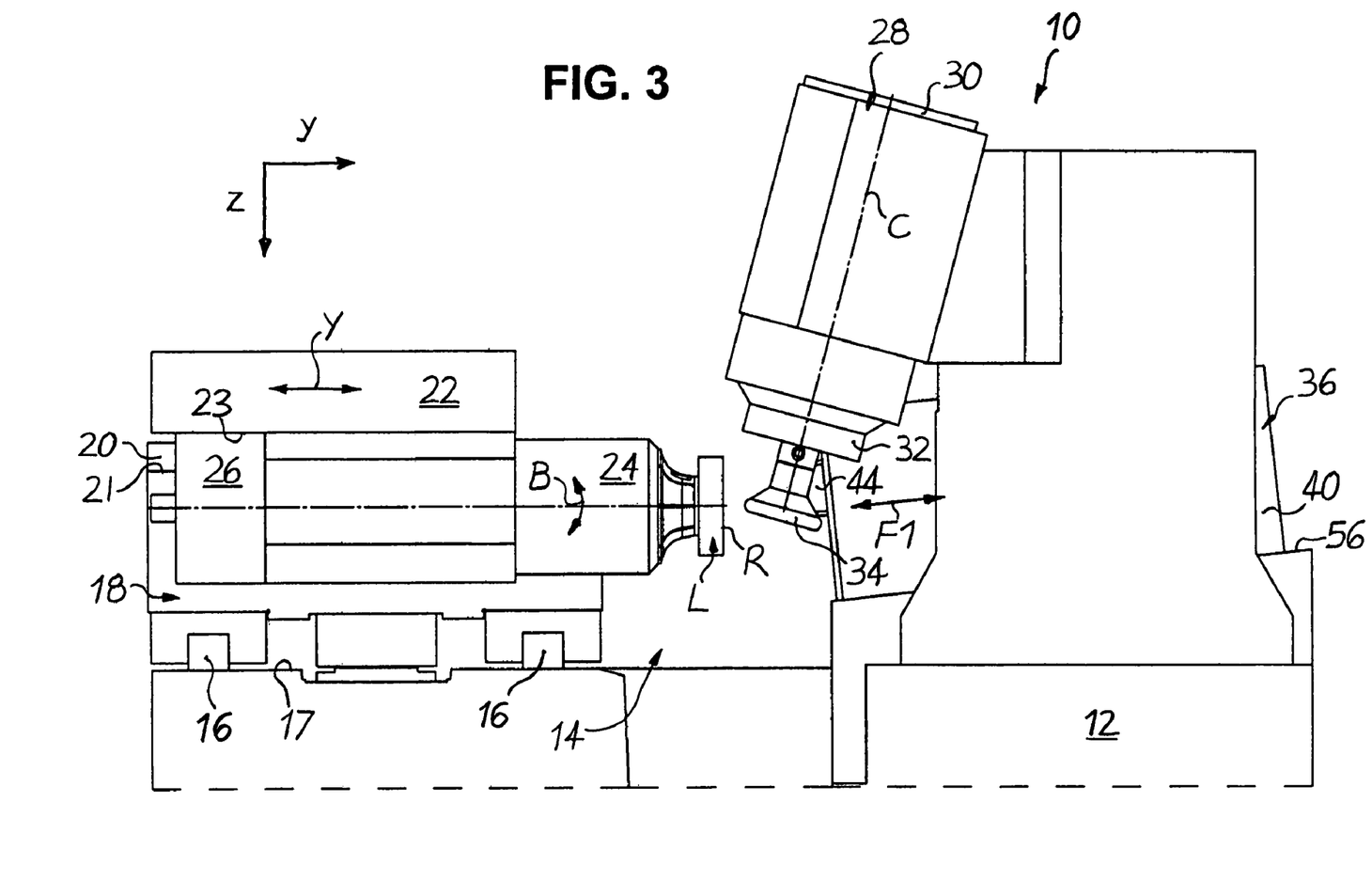
FIG. 3 shows a front view, cut off at the bottom, of the machine according to FIG. 1.
Figure 4:
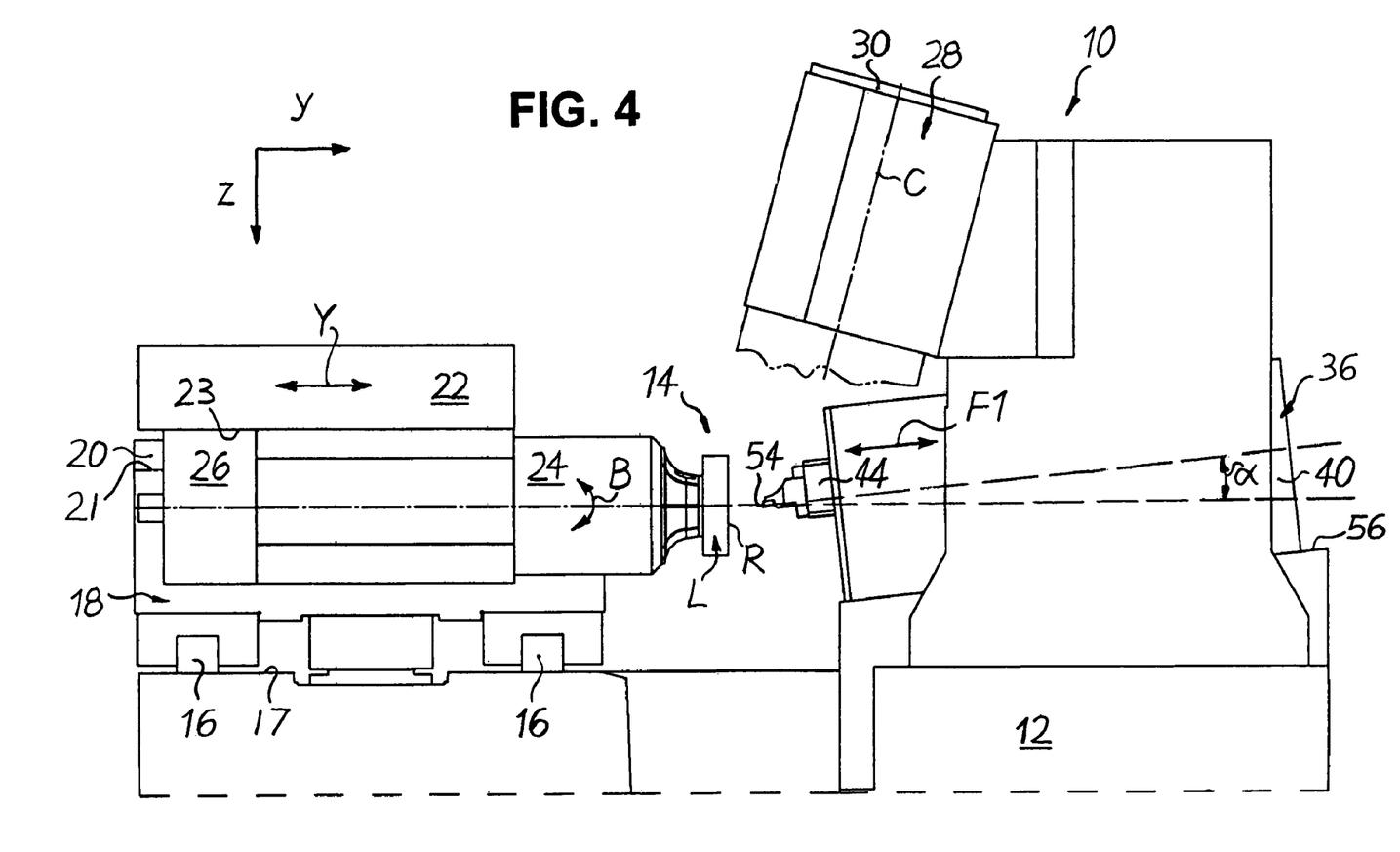
FIG. 4 shows a front view, cut off at the bottom, of the machine according to FIG. 1, which differs from the diagram in FIG. 3 in that a cutter spindle of the cutter unit is shown partially cut off in order to make it possible to see the fast tool arrangement lying behind it.
Figure 5:
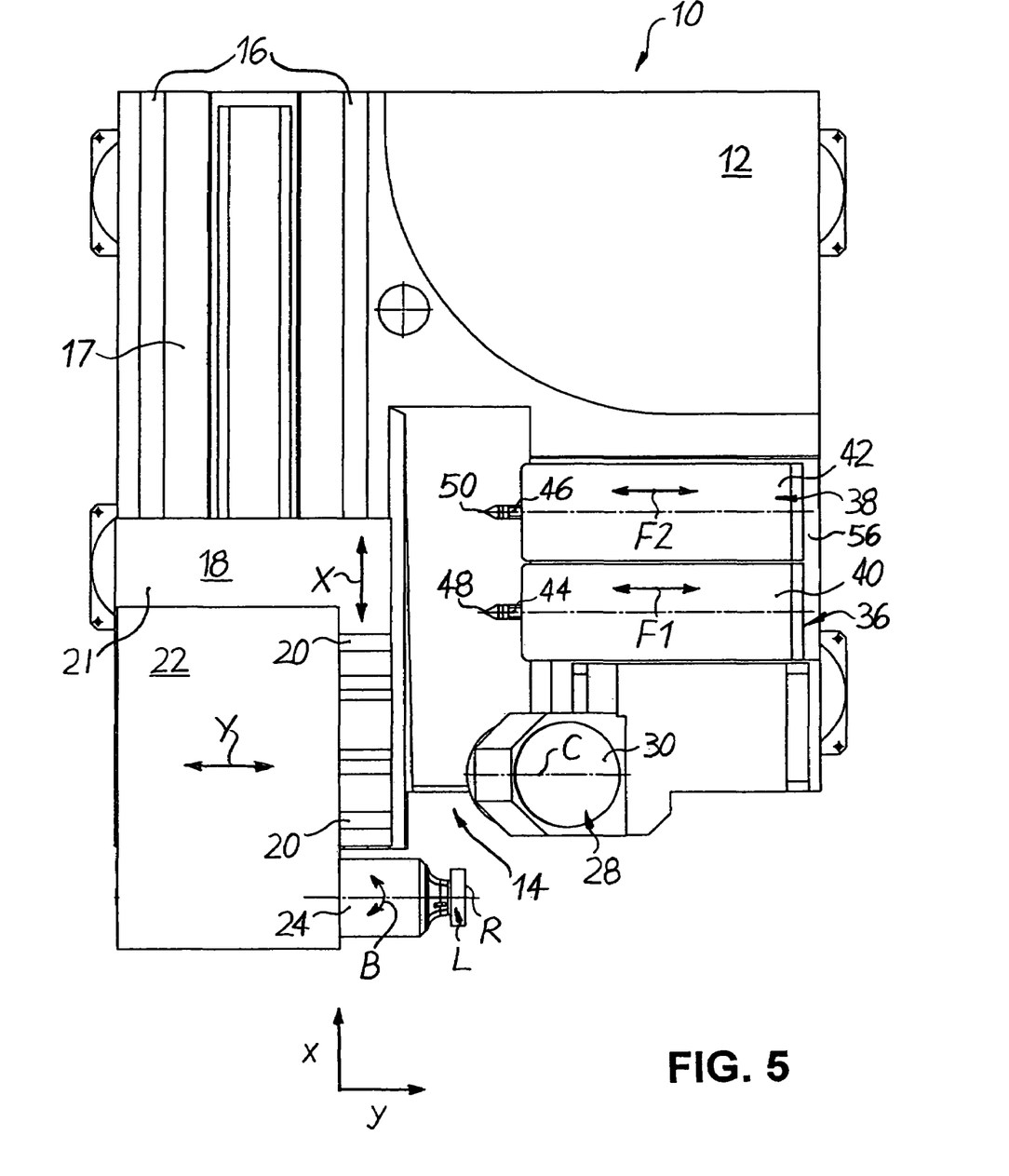
FIG. 5 shows a plan view of the machine according to FIG. 1, in the viewing direction from above in FIGS. 3 and 4.

In FIGS. 1, 3 and 4, at least one, but in the illustrated example two, fast tool arrangements 36, 38 are provided in parallel with one another behind the cutter unit 28 (more than two fast tool arrangements are also conceivable in principle). As known for example from WO 02/06005 A1, each fast tool arrangement 36, 38 comprises an actuator 40, 42 and a respectively associated shuttle 44, 46. While the shuttle 44 of the first fast tool arrangement 36 can be moved axially in both directions of a fast tool axis F1 by means of the actuator 40, the shuttle 46 of the second fast tool arrangement 38 can be moved axially in both directions of a second fast tool axis F2 by means of the actuator 42, said second fast tool axis F2 being parallel to the first tool axis F1. In this case, the position and stroke of the shuttles 44, 46 can be adjusted independently of one another by means of CNC. As shown in FIG. 5, the fast tool axis F1, the fast tool axis F2, the Y axis and the workpiece rotation axis B run in the same direction as seen in plan view. However, as seen in the front view according to FIGS. 3, 4 and 6, the direction of the Y axis and of the workpiece rotation axis B differs from the direction of the fast tool axis F1 on the one hand and of the fast tool axis F2 on the other hand, as will be discussed in greater detail below.

In the illustrated example of embodiment, each of the shuttles 44, 46 carries at its end projecting into the machining area 14 a turning tool 48, 50 which is fastened to the respective shuttle 44, 46 preferably in a fixed position (rather than adjustably) in a manner not shown in any greater detail, so that the turning tools 48, 50 can be moved in a fast tool movement plane (X-F1 plane or X-F2 plane). As shown in particular in FIG. 6, a cutter plate 52 is fitted on the turning tool 48, optionally detachably or as a coating, which cutter plate forms a cutting edge 54 and, depending on the respective requirements, in particular specifically for the material to be machined, may be made of polycrystalline diamond (PCD), CVD, natural diamond or hard metal with or without a wear-resistant coating.

The prescription surface R of the spectacle lens L, which has been premachined by the cutter unit 28, can subsequently be machined in a rotating manner by the fast tool arrangement(s) 36 (and possibly 38), and this once again takes place by adjusting the movement of the spectacle lens L in the X axis and possibly the Y axis, that is to say in the X-Y plane, and by adjusting the movement of the machining turning tool 48 (or 50) in the F1 axis (or F2 axis), that is to say in the X-F1 plane (or X-F2 plane). Here, the fast tool arrangements 36 and 38 can be actuated in such a way that the shuttle not involved in the turning machining operation moves in the opposite direction from the shuttle involved in the turning machining operation, so that the shuttles swing in opposite directions in order to prevent, by virtue of mass compensation, the situation whereby disruptive vibrations are transmitted to the machine frame 12 or to reduce said disruptive vibrations, as disclosed in WO 02/06005 A1. As a result, in the turning machining operation, it is possible to achieve surface qualities which almost correspond to the surface quality that can be achieved with conventional polishing methods.

One particular feature of the above-described machine 10 is that, as already mentioned above in a more general manner, the fast tool arrangements 36 and 38 are mounted on a mounting surface 56 of the machine frame 12 which is tilted or placed at an angle α with respect to the mounting surfaces 17, 21 and 23 for the cross table arrangement (X-slide 18, Y-slide 22) and for the workpiece spindle 24, so that the fast tool movement plane (X-F1 plane or X-F2 plane) is positioned obliquely with respect to the movement plane (X-Y plane) of the workpiece spindle 24 which contains the workpiece rotation axis B. In the illustrated example of embodiment, this angle α is approximately 5°, but it may also be a little larger or smaller, for example in the range from 2° to 10°.

By virtue of this measure, an adjustment of the turning tool 48 by means of the fast tool arrangement 36 in the F1 axis and an adjustment of the turning tool 50 by means of the fast tool arrangement 38 in the F2 axis means that the movement of the respective cutting edge 54 is given two movement components, namely a movement component in the length direction y of the machine 10 and a movement component in the height direction z of the machine 10. The latter can be used to align the working point of the cutting edge 54 of the respective turning tool 48, 50 on the workpiece rotation axis B of the workpiece spindle 24, in order to compensate height errors or differences of the cutting edge 54 in the height direction z. Such a procedure is shown in FIG. 6.

Figure 6:
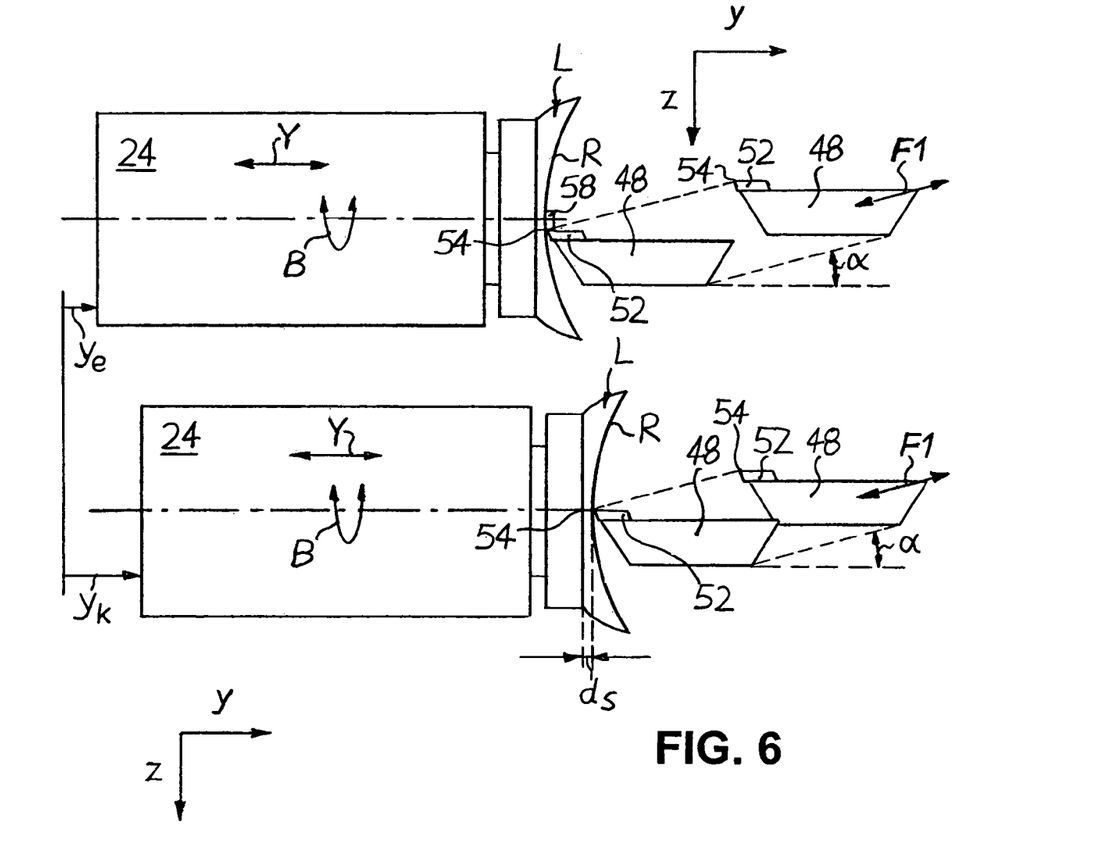
FIG. 6 shows schematic front views of a workpiece spindle of the machine according to FIG. 1, on which a spectacle lens is mounted, said spectacle lens being shown in cross section and being machined by a turning tool of the fast tool arrangement, wherein the top part of FIG. 6 shows an incorrect height adjustment of the turning tool with respect to the workpiece rotation axis of the workpiece spindle, while the bottom part of FIG. 6 shows a correct height adjustment of the turning tool with respect to the workpiece rotation axis.

The top part of FIG. 6 shows an incorrect height adjustment of the turning tool 48. Although in this case a relative adjustment of workpiece spindle 24 and turning tool 48 takes place in the length direction y such that the spectacle lens L at the end of the turning machining operation (turning tool 48 shown on the left) has a thickness in the length direction y which corresponds to the desired thickness, that is to say to the desired final thickness $d_s$ of the spectacle lens L, a surface error remains in the form of a burr 58 on the prescription surface R, said burr being shown to be exaggeratedly large in FIG. 6. This surface error is due to the fact that the turning tool 48, or more specifically the cutting edge 54 thereof, does not "meet" the workpiece rotation axis B at the end of the turning machining operation but rather comes to a stop below the workpiece rotation axis B (in the event of an incorrect axial position $y_e$ of the workpiece spindle 24: tool 48 is too low at the end of the turning machining operation). A comparable, cone-shaped surface error (not shown) is produced when the cutting edge 54 of the turning tool 48 comes to a stop above the workpiece rotation axis B at the end of the turning machining operation, i.e. the tool is too high.

The bottom part of FIG. 6 shows a correct height adjustment of the turning tool 48 with respect to the workpiece rotation axis B, in which no central surface error remains on the prescription surface R of the spectacle lens L. For this, the procedure is as follows. Firstly, for a known position of the cutting edge 54 of the turning tool 48 in the co-ordinate system of the machine 10 and a known work angle α of the fast tool axis F1, an axial position $y_k$ of the workpiece spindle 24 in the length direction y is calculated, at which the working point of the cutting edge 54 of the turning tool 48, at a desired final thickness $d_s$ of the spectacle lens L to be machined, comes to lie in the X-Y plane containing the workpiece rotation axis B, that is to say "meets" the workpiece rotation axis B. The workpiece spindle 24 is then brought into the calculated axial position $y_k$ by positionally controlled axial displacement or adjustment in the Y axis, whereupon axial fixing or holding of the workpiece spindle 24 in the calculated axial position $y_k$ takes place. The rotationally driven spectacle lens L can then be machined under positionally controlled transverse advance of the workpiece spindle 24 in the X axis and positionally controlled (F1 axis) adjustment of the turning tool 48 in the fast tool movement plane, that is to say the X-F1 plane, until the desired final thickness $d_s$ on the machined spectacle lens L is achieved. At the end of the turning machining operation, the cutting edge 54 of the turning tool 48 now automatically "meets" the workpiece rotation axis B.

As an alterative to this, as already mentioned above, the procedure can be such that the workpiece spindle 24 is not held in the Y axis but rather, in addition to the movement of the fast tool arrangement 36 in the F1 axis, a geometry-producing movement of the workpiece spindle 24 in the Y axis also takes place, or more specifically the geometry production is split between the Y axis and the F1 axis in such a way that the Y axis is responsible for the slower movement component while the F1 axis takes on the faster movement component. The advantage of such a procedure is in particular that fast tool arrangements 36, 38 with a smaller stroke and thus greater rigidity can be used, and moreover higher machining speeds can be achieved.

Such a procedure then comprises the following steps. Firstly, a spherical or toric surface geometry is calculated which best corresponds ("best fit sphere" or "best fit toric surface") to the desired surface geometry of the prescription surface R to be machined on the spectacle lens L. Furthermore, as in the previously described procedure, an axial position $y_k$ of the workpiece spindle 24 is calculated, at which the working point of the cutting edge 54 of the turning tool 48, at a desired final thickness $d_s$ of the spectacle lens L to be machined, comes to lie in the X-Y plane containing the workpiece rotation axis B. The rotationally driven spectacle lens L is then machined, specifically under positionally controlled transverse advance of the workpiece spindle 24 in the X axis, positionally controlled adjustment of the workpiece spindle 24 in the Y axis along a movement path which corresponds to the calculated spherical or toric "best fit" surface geometry until the workpiece spindle 24 has reached the previously calculated axial position $y_k$, and simultaneous positionally controlled adjustment of the turning tool 48 in the F1 axis or fast tool movement plane (X-F1 plane), according to differences between the desired surface geometry of the prescription surface R to be machined and the calculated spherical or toric "best fit" surface geometry, until the desired final thickness $d_s$ on the machined spectacle lens L is achieved.

Although in the described example of embodiment the X-Y plane runs horizontally, while the X-F1 plane or the X-F2 plane is tilted out of the horizontal by the angle α, these conditions can also in principle be reversed, with a horizontally running X-F1 plane or X-F2 plane and an X-Y plane that is placed at an angle with respect to the horizontal. A configuration is also conceivable in which both the X-Y plane and the X-F1 or X-F2 plane are tilted out of the horizontal, although by different angles.

In summary, there is disclosed a machine for machining optical workpieces, in particular plastic spectacle lenses, which comprises a workpiece spindle, by means of which the workpiece can be driven in rotation about a workpiece rotation axis, and a fast tool arrangement, by means of which a turning tool can be moved in a fast tool movement plane, wherein the workpiece spindle and the fast tool arrangement can moreover be moved relative to one another in a plane which contains the workpiece rotation axis. According to the invention, the fast tool movement plane is positioned obliquely with respect to the plane containing the workpiece rotation axis. As a result, a machine is provided in which the working point of the cutting edge of the turning tool can be aligned in a particularly simple and highly precise manner on the rotation axis of the workpiece spindle.

Other variations and modifications are possible without departing from the scope and spirit of the present invention as defined by the appended claims.

We claim:

1. A machine for machining optical workpieces having a prescription surface to be machined, the machine comprising:

a workpiece spindle, by means of which the workpiece can be driven in rotation about a workpiece rotation axis (B) that runs through the surface of the workpiece, a fast tool arrangement, by means of which a turning tool can be moved in a fast tool movement direction (F1, F2) towards and away from the surface of the workpiece to engage the turning tool with the surface, wherein the workpiece spindle and the fast tool arrangement can moreover be moved relative to one another in a further direction (X) transverse with respect to said fast tool movement direction (F1, F2);

said further direction (X) and said fast tool movement direction (F1, F2) forming a fast tool movement plane, and said further direction (X) and said workpiece rotation axis (B) forming a second plane; and wherein said fast tool movement plane is positioned obliquely at an angle α with respect to said second plane.

2. A machine according to claim 1, wherein said fast tool movement plane and said second plane enclose a work angle α of between 2° and 10°.

3. A machine according to claim 1, wherein the turning tool can be adjusted in the axial direction in a positionally controlled manner by means of the fast tool arrangement.

4. A machine according to claim 1, wherein the machine is for machining plastic spectacle lenses.

5. A method for machining optical workpieces having a prescription surface to be machined using a machine comprising a workpiece spindle, by means of which the workpiece can be driven in rotation about a workpiece rotation axis (B), that runs through the prescription surface of the workpiece and a fast tool arrangement, by means of which a turning tool can be moved in a fast tool movement direction (F1, F2) towards and away from the surface of the workpiece to engage the surface of the workpiece, wherein the workpiece spindle and the fast tool arrangement can moreover be moved relative to one another in a further direction (X) transverse with respect to said fast tool movement direction (F1, F2), said further direction (X) and said fast tool movement direction (F1, F2) forming a fast tool movement plane, and said further direction (X) and said workpiece rotation axis (b) forming a second plane, wherein said fast tool movement plane is positioned obliquely at an angle α with respect to said second plane; in which machine the workpiece spindle can be moved axially in a positionally controlled manner in the direction of the workpiece rotation axis (B); the method comprising the following steps:

(i) calculation of an axial position ($y_k$) of the workpiece spindle at which the working point of a cutting edge of the turning tool, at a desired final thickness ($d_s$) of the workpiece to be machined, comes to lie in said second plane, (ii) positionally controlled axial adjustment of the workpiece spindle into the calculated axial position ($y_k$), (iii) axial fixing or holding of the workpiece spindle in the calculated axial position ($y_k$), and (iv) machining of the rotationally driven workpiece under positionally controlled transverse advance of the workpiece spindle and positionally controlled adjustment of the turning tool in said fast tool movement plane until the desired final thickness ($d_s$) on the machined workpiece is achieved.

6. A method according to claim 5, wherein the method is for machining plastic spectacle lenses.

7. A method for machining optical workpieces having a prescription surface to be machined, using a machine comprising a workpiece spindle, by means of which the workpiece can be driven in rotation about a workpiece rotation axis (B) that runs through the prescription surface of the workpiece, and a fast tool arrangement, by means of which a turning tool can be moved in a fast tool movement direction (F1, F2) towards and away from the surface of the workpiece, wherein the workpiece spindle and the fast tool arrangement can moreover be moved relative to one another in a further direction (X) transverse with respect to said fast tool movement direction (F1, F2), said further direction (X) and said fast tool movement direction (F1, F2) forming a fast tool movement plane, and said further direction (X) and said workpiece rotation axis (B) forming a second plane, wherein said fast tool movement plane is positioned obliquely at an angle ($\alpha$) with respect to said second plane; in which machine the workpiece spindle can be moved axially in a positionally controlled manner in the direction of the workpiece rotation axis (B); the method comprising the following steps:

(i) calculation of a spherical or toric surface geometry which best corresponds to the desired surface geometry of the surface to be machined on the workpiece, (ii) calculation of an axial position ($y_k$) of the workpiece spindle at which the working point of a cutting edge of the turning tool, at a desired final thickness ($d_s$) of the workpiece to be machined, comes to lie in said second plane, (iii) machining of the rotationally driven workpiece under positionally controlled transverse advance of the workpiece spindle, positionally controlled adjustment of the workpiece spindle along a movement path which corresponds to the calculated spherical or toric surface geometry until the workpiece spindle has reached the calculated axial position ($y_k$), and simultaneous positionally controlled adjustment of the turning tool in said fast tool movement plane, according to differences between the desired surface geometry of the surface to be machined and the calculated spherical or toric surface geometry, until the desired final thickness $d_s$ on the machined workpiece is achieved.

8. A method according to claim 7, wherein the method is for machining plastic spectacle lenses.

9. A machine according to claim 4 further comprising:
the workpiece spindle and the fast tool arrangement can be moved relative to one another in a direction (y) that is aligned with the workpiece rotation axis.

10. A machine according to claim 1 further comprising:
the workpiece spindle and the fast tool arrangement can be moved relative to one another in a direction (y) that is aligned with the workpiece rotation axis.

* * * * *

UNITED STATES PATENT AND TRADEMARK OFFICE
CERTIFICATE OF CORRECTION

| | | |
|---|---|---|
| PATENT NO. | : 7,597,033 B2 | Page 1 of 1 |
| APPLICATION NO. | : 11/415330 | |
| DATED | : October 6, 2009 | |
| INVENTOR(S) | : Marc Savoie and Edward McPherson | |

It is certified that error appears in the above-identified patent and that said Letters Patent is hereby corrected as shown below:

ON THE TITLE PAGE

Section 30 - Foreign Application Priority Data - After "May 6, 2005", delete "(KR)", insert --(DE)-- (Germany)

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO.        : 7,597,033 B2                                    Page 1 of 1
APPLICATION NO. : 11/415330
DATED             : October 6, 2009
INVENTOR(S)       : Savoie et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 548 days.

Signed and Sealed this

Twenty-eighth Day of September, 2010

David J. Kappos
*Director of the United States Patent and Trademark Office*